Dec. 13, 1966 H. L. RATLIFF, JR 3,291,904

STEREOSCOPIC TELEVISION SYSTEM WITH SPECIAL EFFECTS

Filed July 17, 1963 7 Sheets-Sheet 1

INVENTOR

Harvey L. Ratliff Jr.

STEREOSCOPIC TELEVISION SYSTEM WITH SPECIAL EFFECTS

Filed July 17, 1963 7 Sheets-Sheet 2

INVENTOR

Harvey L. Ratliff Jr.

STEREOSCOPIC TELEVISION SYSTEM WITH SPECIAL EFFECTS

Filed July 17, 1963 7 Sheets-Sheet 3

INVENTOR

Harvey L. Ratliff Jr.

INVENTOR
Harvey L. Ratliff Jr.

STEREOSCOPIC TELEVISION SYSTEM WITH SPECIAL EFFECTS

Filed July 17, 1963 7 Sheets-Sheet 5

INVENTOR

Harvey L. Ratliff Jr.

STEREOSCOPIC TELEVISION SYSTEM WITH SPECIAL EFFECTS

Filed July 17, 1963 7 Sheets-Sheet 6

INVENTOR

Harvey L. Ratliff Jr.

INVENTOR

Harvey L. Ratliff Jr.

United States Patent Office 3,291,904 Patented Dec. 13, 1966

3,291,904

STEREOSCOPIC TELEVISION SYSTEM WITH SPECIAL EFFECTS

Harvey L. Ratliff, Jr., Amarillo, Tex., assignor of one hundred percent to Jetru Inc., Amarillo, Tex.

Filed July 17, 1963, Ser. No. 295,792
12 Claims. (Cl. 178—6.5)

The present invention pertains to processes and apparatus whereby wide-angle stereoscopic motion-pictures (cartoon characters and real characters), stereophonic sound, a multiplicity of odors, and many sensations of feel are presented in a unified manner to convey a story or message extremely realistically to each individual of a very large number (several thousand, for example) of individuals who may be in a single auditorium or at remote locations. The term wide-angle as herein referred to means an angle of view between 120° and 180°. In the arts of producing and presenting motion-pictures it has long been the desire to to achieve a medium with the capacity to portray drama, action, scenes, and events, with the same degree of realism as a viewer would see, hear, smell, and feel in the actual situations were he actually present on the spot. For the sake of a full understanding of the problems involved in accomplishing this a review of some of the approaches to the solution which together form the body of knowledge available to those skilled in the motion picture and related arts will be set forth. In the late 1930's and early 1940's with the support of the United States Air Force "Cinerama" was developed. This was a motion picture system that filled approximately 40% of the viewing observer's peripheral field of vision with only a two dimensional picture, and it employed five projectors to fill a screen shaped like a quartersphere. Directional sound was provided by five speakers located behind the screen at different spaced-apart points. Later for its commercial debut in 1952, the five projectors and film strips were reduced to three, reducing the visual field to about 30%.

The three projectors mentioned above were separated behind the proscenium in such a way that the centers of their projected beams crossed at the focal point of the screen's curve. However, a serious disadvantage in Cinerama is the noticeable jiggling between each of its picture segments.

Another arrangement quite similar to Cinerama is one known as "Cinemiracle." This system uses three films and three projectors, but the projectors are located in one central booth rather than dispersed, and like Cinerama, has the jiggling between picture segments.

In 1953 true 3-D movies (which had been invented fifty years earlier) were introduced to the public. This system employs two cameras and two projectors, and furthermore, requires a spectator to use Polaroid glasses in order to have the left eye image reach only the left eye and the right eye image reach only the right eye. Although this system does provide true 3-D, it is hampered seriously by the fact that about only one twelfth of a viewing observer's field of vision is used. Therefore, objects floating in space are disagreeably truncated and limited as to how close they may appear to be to each viewing observer or spectator by a small picture frame.

The next commercial development is known as "Todd-A-O" which is a step forward over the above described arrangements in that the bothersome jiggling between the three sections of Cinerama was eliminated. This was accomplished by putting the entire picture on one piece of 70 mm. film through one large lens as compared with previous methods of using three separate lenses and three strips of 35 mm. film. However, the "Todd-A-O" development loses some of the sharpness which is characteristic of Cinerama and fills only about 25% of the natural peripheral field of vision. In addition, it provides only a two dimensional image.

Following the above, Walt Disney introduced a system known as "Circarama." This is a system that uses eleven projectors to put a two-dimensional picture on a ribbon-like screen that circles about the audience. However, there is no provision for the vertical field of vision of the viewing observers within an audience, and it is plagued by extreme jiggling between each of its eleven frames and because the spectator or viewing observer gets dizzy, turning around to see the image of things happening behind him.

Other recent developments in the trend toward realism include Walter Read's "Aromarama" and Mike Todd Jr.'s "Scent-O-Vision." These add scents to a wide screen Cinemascope or Todd-A-O picture. With the Aromarama system, odors are injected into the theater's air conditioning system, and with the Scent-O-Vision system odors are piped into the arms of the spectators' chairs. Both of these systems are anachronistic when used in conjunction with a two dimensional picture seen through the confines of some 25% window viewing area.

The prior art (since very recently) also includes a wide angle stereoscopic stereophonic odor simulating apparatus which is mounted on a viewing observer's head. This device comprises two cathode ray tubes, two screens, and four eye piece lenses which have magnifying power close to that of a microscope. This device obviously has the disadvantage of not appealing to women who do not want to ruin their hair of hightly prized hat by mounting the device on their heads. This device also has the disadvantage of requiring four eye piece lenses (which are absolutely essential for it to reproduce a wide angle left eye view picture which only the left eye can see, and a wide angle right eye view picture which only the right eye can see). These four lenses make it imperative that the circle of vision allowed by each lens, which is a given distance ( say ½") away from each eye of a viewing observer, is smaller than the circle of vision allowed by each single eye piece lens of the present invention. If the axes of each eye piece lens (or lens system) are parallel to each other and are the interpupillary distance apart (2⁹⁄₁₆") it is possible with the present invention to allow a circle of vision having a diameter of 2⁹⁄₁₆" for each eye. As far as applicant knows he is the only one who teaches a device which makes such a wire circle of vision and thereby such a wide angle of view possible. Of course the portion of the circle of vision which is actually blocked by the nose is impossible for any device to allow. Also as far as applicant knows he in is the only one who teaches a device which requires only one cathode ray tube, only one screen, and only two eye piece lenses to reproduce a superior or wider angle of peripheral vision than has been possible heretofore. Also the prior art teaches wide angle stereoscopic, stereophonic, and odor reproduction within a booth like device for some four people. This device also comprises four eye piece lenses which have the same disadvantages described above. It does not use the television principle at all, but rather uses a complicated projection system to project the images to four different viewing observers at a time. This device requires each viewing observer to hold his or her head to a single spot if he or she wishes to observe the entire reproduction. While applicant's invention is capable of reproducing a superior angle of peripheral vision, superior sterophonic sound (having more directional components as defined in my co-pending application No. 287,338 filed June 12, 1963, and at least equal odor reproduction for several thousand people from the same film or tape, the device of the prior art is only capable of reproducing for some four people from the same film (but not tape) the herein indicated inferior portrayal. The present invention requires nothing (no spectacles or other device) to be mounted on the head, does not preclude people who wear spectacles, requires nothing to be close to the rear proximity of a viewing observer's head, and should therefore not preclude anybody from observing its portrayals without irritation. The present invention allows each viewing observer to move freely from time to time to virtually any position possible in conventional movies. There is prior art which teaches the reproduction of substantially every directional components of sound, however in these systems of the prior art only some 10% of the viewing observers receive substantially perfect directional reproduction and the auditorium needs to be practically as high as it is wide. In the present invention substantially every viewing observer in the auditorium will receive substantially perfect directional reproduction and the auditorium may have several levels, each being less than eight feet high. As far as applicant knows none of the prior art teaches processes or apparatus for correcting for chromatic aberration, barrel distortion, pin cushion distortion, or curvature of field which is even remotely related to that taught by applicant. The present invention is capable with great precision at small cost of giving odors to and removing odors from every viewing observer of the thousands of viewing observers within an auditorium, since only the air near each viewing observer's nose is involved. The odor substances do not have to be carried long distances by large volumes of air as in "Aromarama" or "Scent-O-Vision." This eliminates the time lag and overlap of one scent with another. The prior art teaches such high quality scent reproduction is capable of it for an audience which is less than 0.1% of the audience within the capacity of the present invention. As far as applicant is aware none of the prior art teaches the simulation of temperature conditions, wind conditions, sunshine conditions, and other environmental conditions associated with the extensive stereoscopic, wide-angle, stereophonic, and odor conditions of the present invention reproduced from a single film or tape for such a large audience in a single auditorium (or in auditoriums).

It is accordingly the primary object of this invention to teach a novel means capable of portraying drama, action scenes, events, cartoons, and stories with substantially complete realism as far as the senses of sight, hearing, and smelling are concerned and with considerable realism as far as the non-participating elements of the sense of feel are concerned before each individual viewing observer of thousands of viewing observers within each of an unlimited number of auditoriums.

It is a further object of this invention to teach a novel means capable of portraying drama, action scenes, events, cartoons, and stories in a manner which lasts some two hours, capable of costing each viewing observer reasonable rates with a reasonable profit left for the theater owner, precludes no class of people (not women and not people who wear spectacles), requires that nothing be mounted on the head of any viewing observer, allows each viewing observer substantially the same freedom of movement allowed in conventional movies, has virtually no chromatic aberration, distortion, or curvature of field, and requires very little intelligence on the part of each viewing observer.

Other objects and advantages of my invention will become apparent from a study of the following description taken with the accompanying drawings wherein:

FIG. 1 schematically illustrates a contemplated air conditioning system which makes possible the present invention.

Figure 1:
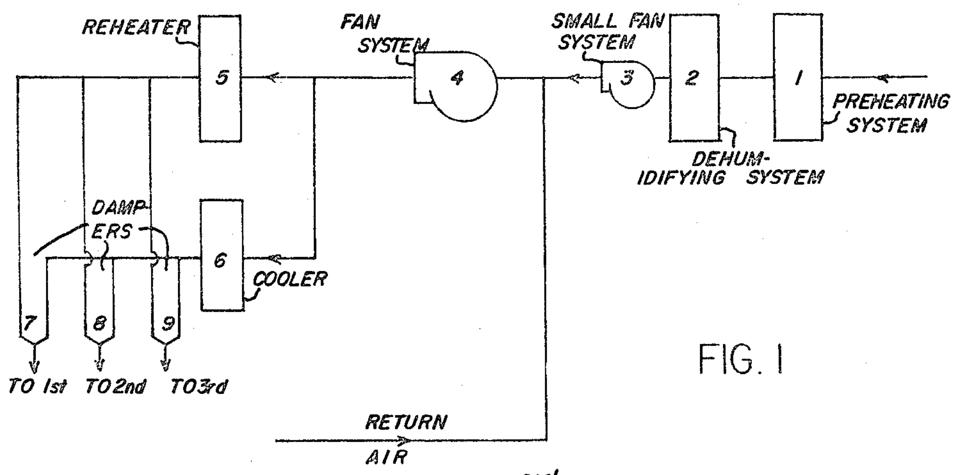

Referring more particularly to the drawings reference is made to FIG. 1. Outside air is pulled in through pre-heating system 1 (which may be any desirable well known pre-heating system, dehumidifying system 2 (which may be any desirable well known dehumidifier), and small fan system 3. Fan system 4 forces the dehumidified and pre-heated outside air and the return air partly through re-heater 5 and partly through sensible cooler 6 and out to the various levels of the auditorium (for example the first, second and third levels) through the various mixing dampers for example 7, 8 and 9. The air then, of course, completes it circuit back through the return duct system to the point between fans 3 and 4.

Figures 2, 3:
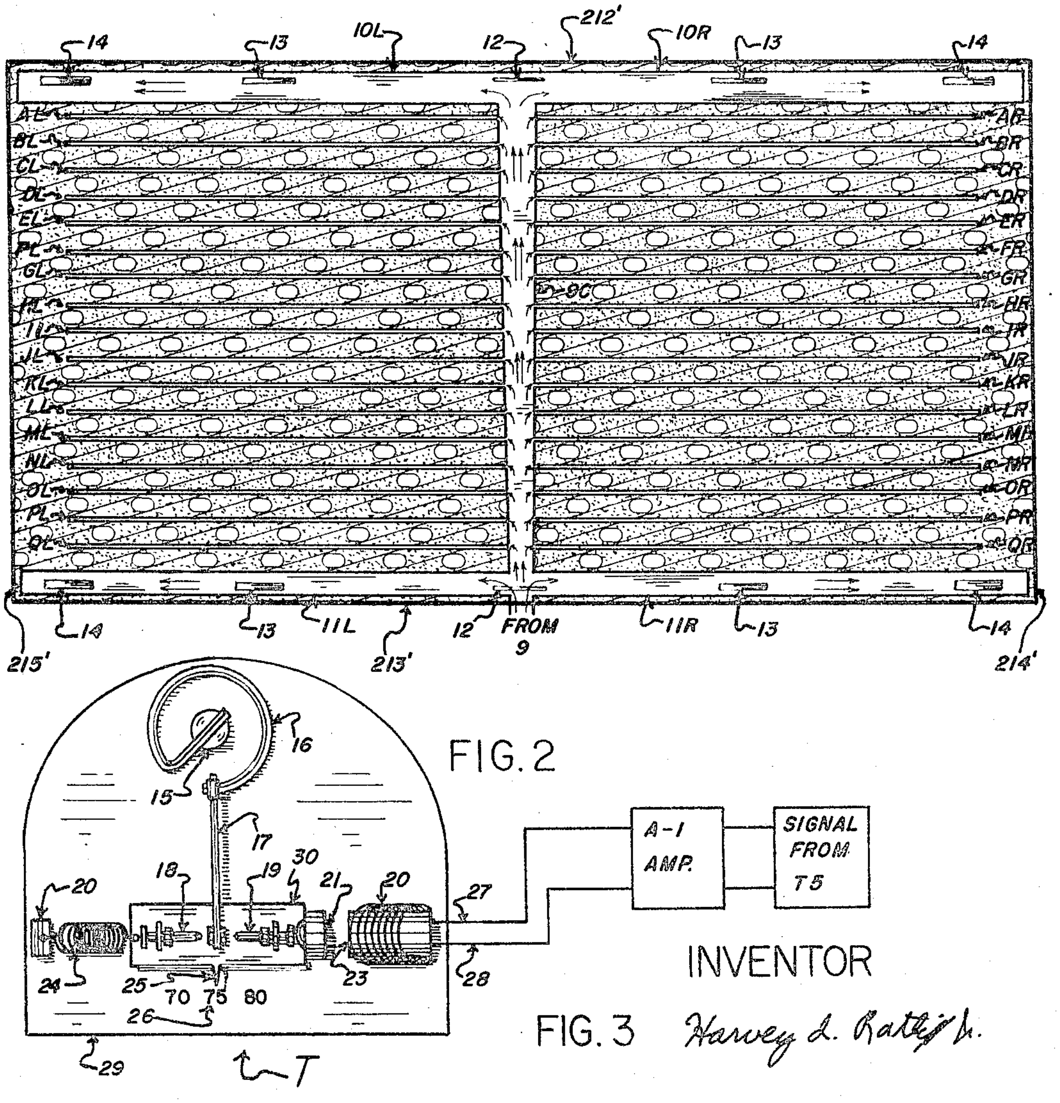
FIG. 2 is a sectional view of the floor of a contemplated novel level of an auditorium which makes possible the present invention.
FIG. 3 is designed to illustrate a contemplated novel electronically controlled thermostat of the invention.

Reference is now made to FIG. 2. On a specific level of an auditorium (for example the third level) the air is forced out of the mixing damper system (for example 9) into ducts 11L, 9C and 11R. A portion of the air within duct 9C is forced down to ducts 10L and 10R. Another portion of air within duct 9C is forced down ducts beneath each seating row of said specific level, for example AL, AR, BL, BR, CL, CR, DL, DR, EL, ER, FL, FR, GL, GR, HL, HR, IL, IR, JL, JR, KL, KR, LL, LR, ML, MR, NL, NR, OL, OR, PL, PR, QL, AND QR. The air within ducts such as 10L, 10R, 11L and 11R is forced up through floor outlets such as 12, 13, and 14 which are immediately adjacent the walls 212' and 213' of the theater (in the contemplated form of the invention).

Figures 4, 5:
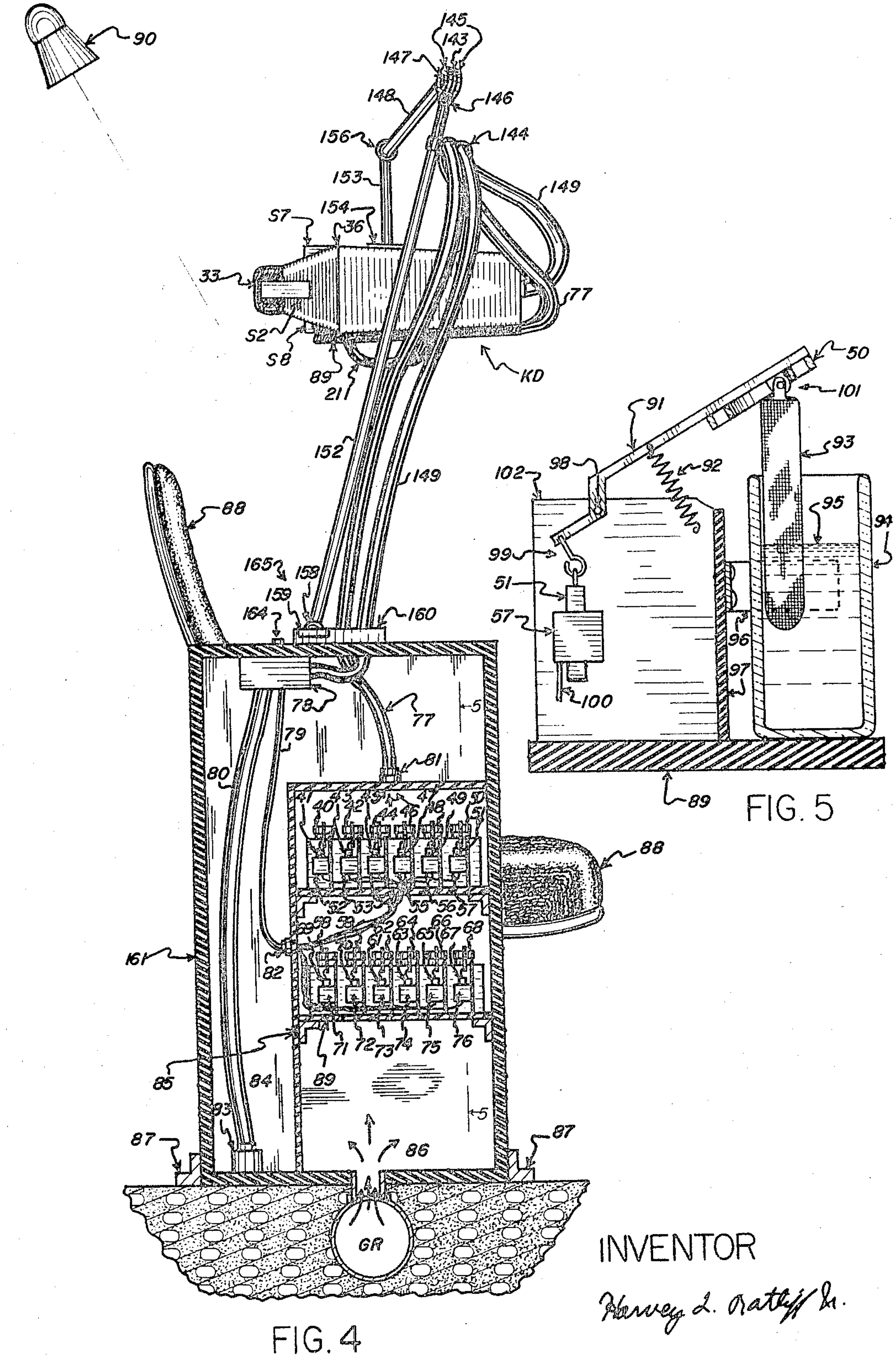
FIG. 4 is a side sectional view of one of the cabinets and one of the ducts, a side partial sectional view of the floor, a side view of one of the seats, one of the kinescopic optical viewing devices with its associated speakers and odor outlets, and one of the heat radiation lamps of one of the levels of the auditorium of the invention.
FIG. 5 is a sectional view taken along 5—5 of FIG. 4 of one of the vessels and its associated apparatus contemplated for the invention.

Reference is now made to FIG. 4. The air within each duct underneath each seating row (for example GR) is forced up into each substantially air tight chamber (such as 85) of each cabinet (such as 161) between each pair of seats of said specific level. There are two outlets such as 81 (one being to the right of the paper) from each chamber 85 which both function as 81. The air within each chamber such as 85 is forced over the various odor containing vessels (such as 94 of FIG. 5) out two outlets such as 81 through two hoses such as 77 out before the noses of two viewing observers (viewing into two KD sets) through two chambers such as 89. Each cabinet (such as 161) of the auditorium serves two KD sets and two odor chambers such as 89. It is here pointed out that chamber 89 has a small outlet on each side of speaker S8.

The diameters of the various ducts set forth above are made such (in a well known manner) that the proper amount of air will be forced through the outlets of chambers such as 89 (before the noses of viewing observers) and that the proper amount of air will be forced out of outlets such as 12, 13, and 14.

Reference is now made to FIG. 3. Signals are recorded on track T5 (which may be either optical or magnetic) in a manner which will hereinafter be described. These signals are amplified by A–1 and applied to the coil 22 of electromagnet 23 through wires 27 and 28. The greater the current output of A–1 caused by the signals recorded on T5, of course, the greater the current through coil 22 and thereby the greater the magnetic attraction electro-magnet 23 has for metal element 21. Metal element 21 is rigidly secured to movable base 30. Movable base 30 is allowed to move horizontally to the left or to the right, but is held from all other motion by a well known means attached to base 29. Biasing spring 24 is attached on one end to element 20 (which is rigidly secured to base 29) and is attached on its other end to movable base 30. If the minimum force is exerted by electro-magnet 23, biasing spring 24 will pull movable base 30 such that pointer 25 points to 69° F. When maximum voltage is reproduced from T5 through A–1, electro-magnet 23 pulls movable base 30 against biasing spring 24 such that pointer 25 points to 81° F. on scale 26. The thermostat T is wired such that when contact 19 touches contact 17, the cooling system 6 is turned on to cool the auditorium, such that when contact 18 touches contact 17, the pre-heating and re-heating systems 1 and 5 respectively are turned on to heat the auditorium, and such that when contact 17 touches neither 18 nor 19, neither 1 and 5 nor 6 is turned on. The air conditioning system is designed such that fans 3 and 4 of FIG. 1 are always in operation to thereby insure that air is always forced out of the outlets of the chambers such as 89 of FIG. 4 to thereby always be available to carry odors to viewing observers. Compound bar 16 is rigidly secured to base 29 by element 15. Compound bar 16 operates in a well known manner to keep contact 17 in the proper location required to keep the temperature of the auditorium in close proximity to that indicated by pointer 25 on scale 26.

Figure 6:
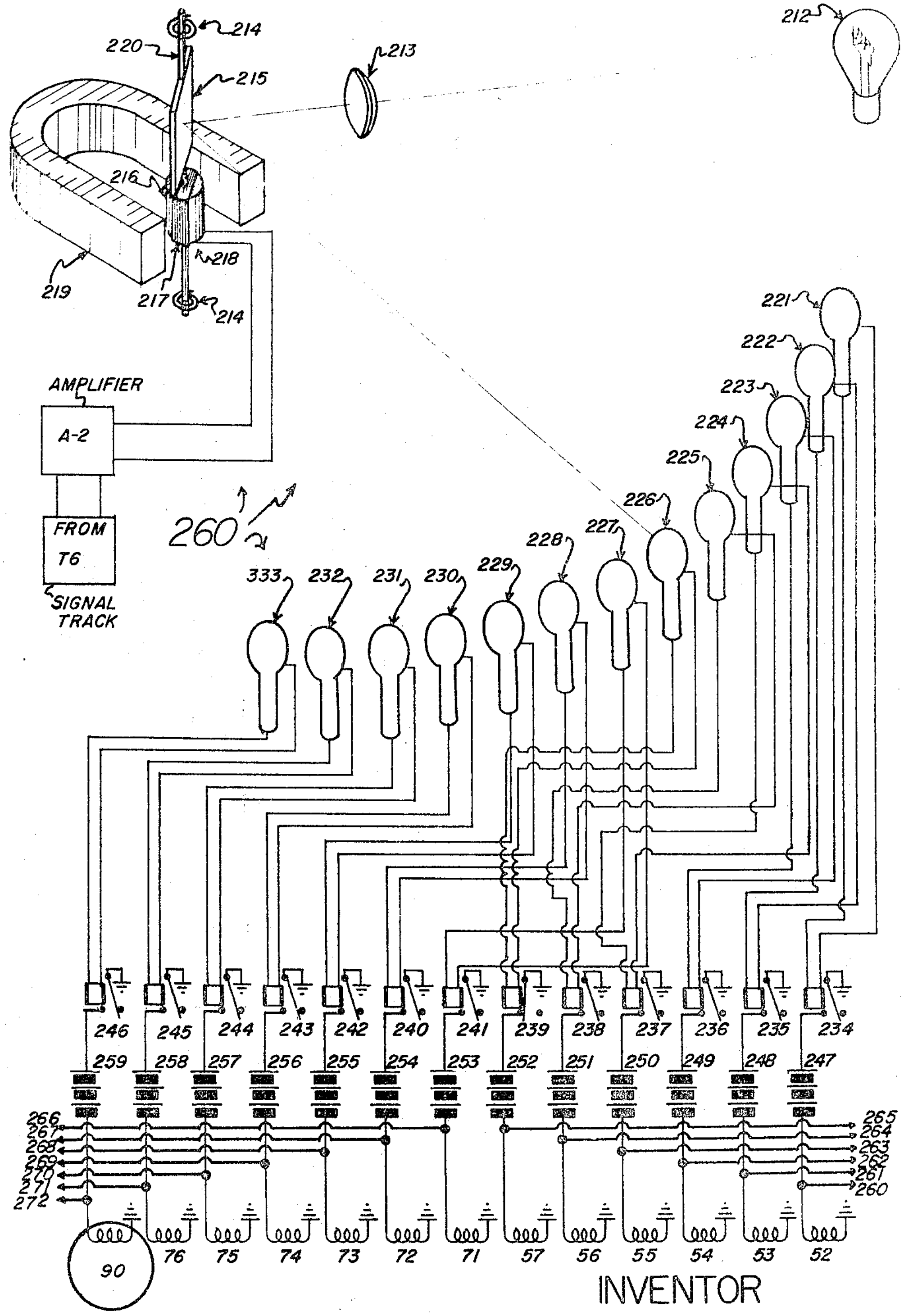
FIG. 6 is designed to illustrate the contemplated switch which electronically controls the odor reproduction of the present invention.

Reference is now made to FIG. 6. Voltage signals are recorded on Track T6 (which may be either optical or magnetic) in a manner which will also hereinafter, be described. These voltages (which of course produce currents) are amplified by A–2 and applied to coil 217 wrapped around core 216 of the electromagnet 218 of a movable coil type galvanometer of switch 260. Rod element 220 is pivoted on jeweled bearings and biased by spring 214 in a well known manner. Reflecting element 215 and electro-magnet 218 are rigidly secured to rod element 220. Light travels from lamp 212 through lens system 213, is reflected from reflecting element 215 to one of photo-electric cells 221, 222, 223, 224, 225, 226, 227, 228, 229, 230, 231, 232, or 233 which are each the same distance from 215. Lens systems 213 is a well known lens system which focuses the light from 212 upon one of photo-electric cells 221, 222, 223, 224, 225, 226, 227, 228, 229, 230, 231, 232, or 233. Switch 260 is designed such that when the current output of A–2 (caused by the signal from T–6) is maximum the magnetic flux of 218 interacting with the magnetic flux produced by permanent magnet 219 causes reflector 215 to be rotated such that the light from 212 is focused on photo-cell 233. Likewise switch 260 is designed such that when the current output of A–2 (caused by the signal from T–6) is minimum, the magnetic flux of 218 interacting with the magnetic flux produced by permanent magnet 219 causes reflector 215 to be rotated such that the light from 212 is focused on photo-cell 221. At the particular instant of time of the drawing of FIG. 6, the signal from T6 sets the output of A–2 such that the light from 212 is focused on photo-cell 226 which actuates relay 239, however, depending upon the signal recorded on T6, the light from 212 may be focused on any of photo-cells 221, 222, 223, 224, 225, 226, 227, 228, 229, 230, 231, 232, and 233 which each actuate relays 234, 235, 236, 237, 238, 239, 241, 240, 242, 243, 244, 245, and 246 respectively.

At the particular instant of time of the drawing of FIG. 6 relay 239 is closed (as described hereinabove) and current from power source 252 is applied to the coil of electro-magnet 57 (of FIGS. 4, 5, and 6) which pulls down metallic element 51 (of FIG. 5) which pulls down linkage element 99 which causes arm 91 to pivot about pin 98 (which is rigidly secured to vertical wall or partition 102) to thereby lift lid 50 off of vessel 94 and to lift wick 93 from perfume 95 to allow the air traveling through chamber 85 to carry the odor from perfume 95 from wick 93 through hose 77 out of chamber 89 to the nose of a viewing observer viewing into KD. When the light from 212 is not focused on photo-cell 226, relay switch 239 is opened, electromagnet 57 is de-actuated, and spring 92 closes lid 50 to thereby seal perfume 95 from the air traveling through chamber 85 and to thereby eliminate the odor traveling out of chamber 89 to the nose of a viewing observer. However, any one of relays 234, 235, 236, 237, 238, 239, 241, 240, 242, 243, 244, or 245 could be closed (as described hereinabove) and current from power sources 247, 248, 249, 250, 251, 252, 253, 254, 255, 256, 257, or 258 respectively could be applied to the coils of electro-magnets 52, 53, 54, 55, 56, 57, 71, 72, 73, 74, 75, or 76 respectively (of FIGS. 4 and 6) which pulls down metallic elements 41, 43, 45, 47, 49, 51, 69, 70, 61, 63, 65, or 67 respectively (of FIG. 4) each of which could pull down a linkage element identical to 99 (of FIG. 5), which would cause an arm (identical to 91 of FIG. 5) to pivot about a pin (which is identical to 98 of FIG. 5) to thereby each lift lids 40, 42, 44, 46, 48, 50, 58, 59, 62, 64, 66, or 68 respectively off of each vessel (which are each identical to 94 of FIG. 5) and to each lift a wick (which is identical to 93) from a perfume or smelling substance to allow the air traveling through chamber 85 to carry the odor from the perfume (such as 95 of FIG. 5) from the wick (such as 93 of FIG. 5) through hose 77 out of chamber 89 to the nose of a viewing observer viewing into KD. When each relay is de-activated each lid closes as lid 50 of FIG. 5 to thereby eliminate the corresponding odor from traveling out of chamber 89 to the nose of a viewing observer. The current from any one of power sources 247, 248, 249, 250, 251, 252, 253, 254, 255, 256, 257, or 258 could be applied through bus lines 260, 261, 262, 263, 264, 265, 266, 267, 268, 269, 270, or 271 to each cabinet (such as 161 of FIG. 4) of the auditorium. The perfume vessels of each cabinet of the auditorium each function as described hereinabove. Photo-cell 221 activates all of the vessels in each auditorium (which may be thousands such as 94) carrying a specific perfume. Photo-cell 222 activates all of the vessels in each auditorium (which may be thousands) carrying a second specific perfume which is substantially different from the first perfume. Photo-cell 223 activates all the vessels in each auditorium carrying a third specific perfume or smelling substance which is substantially different from the perfumes or smelling substance activated by any other photo-cell. Likewise photo-cells 224, 225, 226, 227, 228, 229, 230, 231, and 232 each activate a corresponding perfume in every corresponding vessel in the auditorium, which is substantially different from the perfume activated by any other photo-cell. A specific signal recorded on T6 of the film or tape will always activate a specific predetermined perfume if the apparatus of the invention is functioning properly.

Within the auditorium there is a sunshine simulating lamp 90 behind each KD set which (in the contemplated form of the invention) includes at least an ultra-violet light emitting lamp. Each portrayal of drama, action, and the like will be designed such that the ultra-violet light will not be on more than thirty total minutes (to thereby stop sunburn and the like), and not more than 10 consecutive minutes at a time. Also each lamp 90 will be focused such as to be limited to an area of approximately 1 square foot within close proximity to the back of each viewing observer to thereby reduce as much as possible the already small possibility of a person turning their head completely around and looking almost straight up but slightly to their rear to look into their sunshine simulating lamp 90 (which is the only one that will be focused and directed such as is necessary to shine ultra-violet light into their eyes). If may prove desirable to use only infra-red light as sunshine simulators and to use the ultra-violet lights only as disinfectants and de-odorizes when there are no spectators or viewing observers in the auditorium useing the KD sets. When the theater is closed some of the theater attendants may place the face guiding eye shields 33 of FIG. 4 within the rays of its corresponding ultra-violet light to thereby keep them sterilized and sanitary, and to de-odorize chambers such as 89 of FIG. 4. For this purpose ultra-violet lights 90 will be turned on in a well known manner neither illustrated nor described here.

When the signal from T6 (of FIG. 6) causes the output from A–2 to be sufficiently great to deflect reflector 215 such that the light from 212 is focused on photo-cell 233, relay 246 is closed and the power from power source 259 (which is really standard 110 or 220 A.C. voltage) is applied to lamp 90 of FIG. 6 and is also applied through bus line 272 to each sunshine simulating lamp 90 over each KD set in the auditorium.

Figure 7:
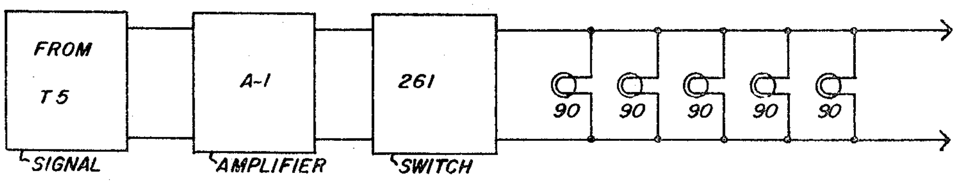
FIG. 7 is a block diagram which is designed to illustrate one of the contemplated methods of controlling the heat radiation lamps of the invention.

Reference is now made to FIG. 7. The output of A–1 is also applied to a coil of switch 261 (which functions as 217 of switch 260). When the current output from A–1 is sufficiently great to cause pointer 25 of FIG. 3 to point to 81° on scale 26, it is also sufficiently great to cause switch 261 (which functions on the principles of switch 260) to throw a relay which causes all of the sunshine simulating lamps 90 within the auditorium to turn on.

At this point it may be seen that either track T5 or track T6 is capable of causing sunshine simulating lamp 90 to turn on.

At this stage FIG. 4 will be more completely described. Each viewing observer sits in a seat such as 88 and views into a face guiding eye shield such as 33. He uses a handle such as 211 to place his corresponding kinescopic optical viewing device KD in a position which allows him the greatest comfort. Between every other seat (such as 88) there is a cabinet such as 161, which may be to the right or to the left of a specific viewing observer. The electronics of the video and optical portion of each kinescopic optical viewing device KD may be as described in my co-pending prior applications 275, 411, filed April 24, 1963 and 291,198, filed June 27, 1963, it may even be as described in my co-pending prior application 250,562, filed January 10, 1963. The stereophonic system of the present invention is as described in my co-pending prior application 287,338, filed June 12, 1963. The preferred system uses S2, S6, S7, S8, S5B and S5T and is that illustrated in FIGS. 13(*a*), 14(*a*), 16, and 17 or FIGS. 13(*a*), 14(*a*), 16, and 21 of the hereinabove later cited application 287,338. Also elements 160, 159, 158, 165, 152, 146, 145, 143, 147, 148, 156, 153, and 154 function as described in 287,338, filed June 12, 1963.

The various wires to carry the various video left and right eye view picture and scanning signals, the various stereophonic signals (from T1, T2, T3, and T4), and the various odor signals (from T6) are brought from their corresponding bus line up within 161 through outlet 83 through conduit 80 and into switch box 78. They are each connected through on-off switch within 78 controlled by 164. The wires carrying the video picture and scanning signals and the wires carrying the stereophonic sound signals are brought out of switch box 78 within conduit 149 through base 160 and into the rear of the kinescopic optical viewing device KD with in which they are properly connected to the various tubes and speakers as described in my co-pending applications 275,411 and 287,338 or 250,562. The wires carrying the various odor signals are brought out of switch box 78 within conduit 79 through element 82 into chamber 85 within which they are connected as hereinabove described.

Figures 8, 9:
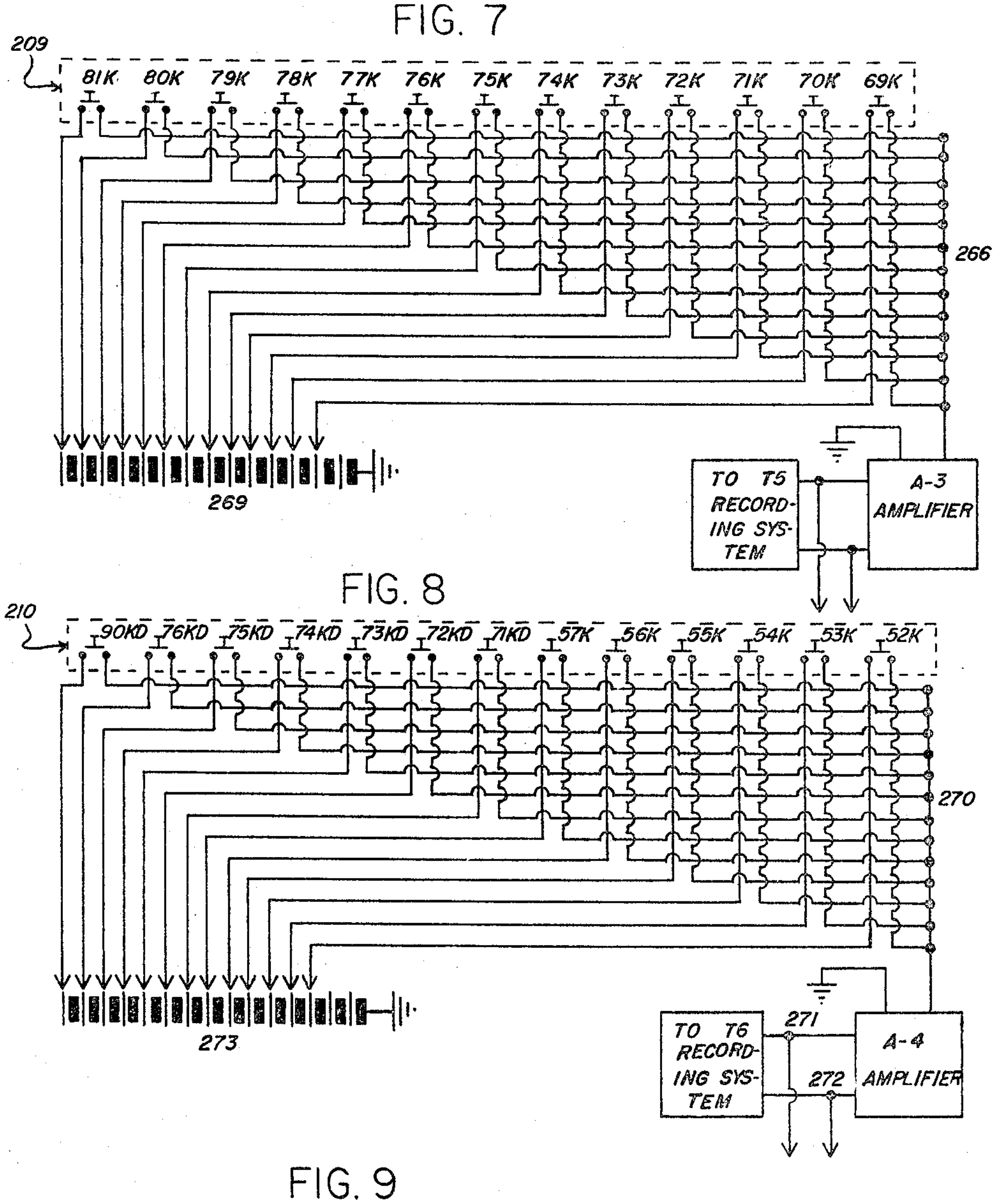
FIG. 8 is a schematic diagram designed to illustrate the contemplated manner of recording the proper temperature and some of the sunshine simulating signals of the invention.
FIG. 9 is a schematic diagram designed to illustrate the contemplated manner of recording the proper odor simulation and some other sunshine simulating signals of the invention.

At this point contemplated methods of recording the temperature, odor, and sunshine signals will be set forth. Reference is made to FIG. 8. Push bottom switches 69K, 70K, 71K, 72K, 73K, 74K, 75K, 76K, 77K, 78K, 79K, 80K, and 81K are all placed on a single panel (print or switch board) 209 which is made small enough in a well known manner to be placed in the lap of a single person. Switch 69K is connected across a first voltage which is the least potential output of D.C. power source 269; switch 70K is connected across a second slightly higher potential output of D.C. power source 269 than is 69K. Switch 71K is connected across a third slightly higher potential output of D.C. power source 269 than is 70K. Switch 72K is connected across a fourth slightly higher potential output of D.C. power source 269 than is 71K. Switch 73K is connected across a fifth slightly higher potential output of D.C. power source 269 than is 72K. Switch 74K is connected across a sixth slightly higher potential output of D.C. power source 269 than is 73K. Switch 75K is connected across a seventh slightly higher potential output of D.C. power source 269 than is 74K. Switch 76K is connected across an eighth slightly higher potential output of D.C. power source 269 than is 75K. Switch 77K is connected across a ninth slightly higher potential output of D.C. power source 269 than is 76K. Switch 78K is connected across a tenth slightly higher potential output of D.C. power source 269 than is 77K. Switch 79K is connected across an eleventh slightly higher potential output of D.C. power source 269 than is 78K. Switch 80K is connected across a twelfth slightly higher potential output of D.C. power source 269 than is 79K. And switch 81K is connected across a thirteenth slightly higher potential output of D.C. power source 269 than is 80K. When key or push button 69K is pushed the output from amplifier A–3 causes a suitable optical density (in the case of an optical track) or magnetic alignment (in the case of a magnetic track) to be recorded on track T5 to reproduce the current output of A–1 required to cause pointer 25 of FIG. 2 to point to 69° on scale 26. The recording system indicated in the block of FIG. 8 uses the same principles as used in recording the voltage variations required for sound reproduction (the difference being that the voltage variation associated with sound recording have a much greater frequency than the voltage variations required to control thermostat T and switch 261 from T5). Patents 2,258,993, 2,256,402, and 2,628,288 teach apparatus and means for recording voltages which could be used (as the recording system of T5 indicated in FIG. 8) to record the voltages necessary for the temperature control of the present invention. It may now be seen that when any of keys 70K, 71K, 72K, 73K, 74K, 75K, 76K, 77K, 78K, 79K, 80K or 81K are pushed the output from amplified system A–3 causes a suitable corresponding optical density (in the case of an optical track) or magnetic alignment (in the case of a magnetic track) to be recorded on track T5 to reproduce the current output of A–1 required to cause pointer 25 of FIG. 2 to point respectively to any corresponding 70° F., 71° F., 72° F., 73° F., 74° F., 75° F., 76° F., 77° F., 78° F., 79° F., 80° F., or 81° F. marker on scale 26.

After the video portion, sound portion, and odor portion of the portrayal of drama, action, scenes, events and the like in accordance with the present invention has been recorded on film or tape, a temperature expert sit in a representative seat, on a representative level within a representative auditorium, places panel 209 (which is properly wired as described hereinabove) on his lap and views properly into KD as a finished production of the video portion, sound portion, and odor portion of the portrayal is being reproduced.

When he believes the portrayal requires a temperature of 69° F., he pushes 69K to connect said first potential across amplifier system A–3. When he believes the portrayal requires a temperature of 75° F., he pushes 75K to connect said seventh potential across amplifier system A–3. Likewise when he believes the portrayal requires any one of temperatures 70° F., 71° F., 72° F., 73° F., 74 F., 75° F., 76° F., 77° F., 78° F., 79° F., 80° F., or 81° F., he pushes the corresponding respective key of 70K, 71K, 72K, 73K, 74K, 75K, 76K, 77K, 78K, 79K, 80K, or 81K to connect said second, third, fourth, fifth, sixth, seventh, eighth, ninth, tenth, eleventh, twelfth or thirteenth potential respectively across A–3. The output of terminals 267 and 268 may be applied through a suitable amplified to electro magnet 23 (see FIG. 3) such that he may feel the exact temperature he is recording as he views into KD to see, hear, and smell wide-angle, stereoscopic, stereophonic, odorized portrayal which is being reproduced before him.

It is here pointed out that the temperature of 69° F. is taken to simulate cold conditions and the temperature of 81° F. is taken to simulate hot conditions. When the relative humidity within a particular theater or auditorium is 60% the signal recorded on T5 when key 69K is pushed should actually be amplified by A–1 such as to cause pointer 25 to point to marker 69° on scale 26 and the signal recorded on T5 when key 81K is pushed should actually be amplified by A–1 such as to cause pointer 25 to point to marker 81° F. on scale 26. However, it is well known that temperature relative humidity conditions of 69° F. and 60% relative humidity create approximately the same temperature sensation as 71° F. and 50%—72° F. and 40%—73° F. and 30%—74° F. and 20%—75° F. and 10%—68° F. and 70%—67.5° F. and 80%—67° F. and 90%—66.5° F. and 100%. It is also well known that temperature relative humidity conditions of 81° F. and 60% relative humidity create approximately the same temperature sensation as 82° F. and 50%—84° F. and 40%—86° F. and 30%—88° F. and 20%—91° F. and 10%—79° F. and 70%—78° F. and 80%—77° F. and 90%—76° F. and 100%.

It is therefore pointed out that if 69° F. and 60% are chosen to simulate cold conditions (to simulate cold conditions without making the viewing observers too uncomfortable), in a theater where the relative humidity is 10%, amplifier A–1 should be set such that the signal recorded by pushing key 69K causes pointer 25 to point to 75° F. on scale 26 and such that the signal recorded by pushing key 81K causes pointer 25 to point to 91° F. on scale 26. There are other obvious changes in the adjustment of A–1 for other relative humidities. It is probably more practical to adjust A–1 for a mean seasonal relative humidity.

Reference is now made to FIG. 9. Push bottom switches 52K, 53K, 54K, 55K, 56K, 57K, 71KD, 72KD, 73KD, 74KD, 75KD, 76KD, and 90KD are all placed on a single panel (or switch board 210, which is made small enough in a well known manner to be placed in the lap of a single person. Switch 52K is connected across a first voltage which is the least potential output of D.C. power source 273. Switch 53K is connected across a second slightly higher potential output of D.C. power source 273 than is 52K. Switch 54K is connected across a third slightly higher potential output of D.C. power-source 273 than is 53K. Switch 55K is connected across a fourth slightly higher potential output of D.C. power source 273 than is 54K. Switch 56K is connected across a fifth slightly higher potential output of D.C. power source 273 than is 55K. Switch 57K is connected across a sixth slightly higher potential output of D.C. power source 273 than is 56K. Switch 71KD is connected across a seventh slightly higher potential output of D.C. power source 273 than is 57K. Switch 72KD is connected across an eighth slightly higher potential output of D.C. power source 273 than is 71KD. Switch 73KD is connected across a ninth slightly higher potential output of D.C. power source 273 than is 72KD. Switch 74KD is connected across a tenth slightly higher potential output of D.C. power source 273 than is 73KD. Switch 75KD is connected across an eleventh slightly higher potential output of D.C. power source 273 than is 74KD. Switch 76KD is connected across a twelfth slightly higher potential output of D.C. power source 273 than is 75KD. And switch 90KD is connected across a thirteenth slightly higher potential output of D.C. power source 273 than is 76KD.

When key or push button 52K is pushed the output from amplifier A–4 causes a suitable optical density (in the case of an optical track) or magnetic alignment (in the case of a magnetic track) to be recorded on track T6 to reproduce the current output of A–2 required to cause photocell 221 of FIG. 6 to be actuated as described hereinabove. The recording system indicated in the block of FIG. 9 uses the same principles as used in recording the voltage variations required for sound reproduction (the difference being that the voltage variations associated with sound recording have a much greater frequency than the voltage variations required to control switch 260 from T6). The Patents 2,258,993, 2,256,402, and 2,628,288 teach apparatus and means for accomplishing the recording necessary for both T5 and T6 as described hereinabove.

It may now be seen that when any of keys 52K, 53K, 54K, 55K, 56K, 57K, 71KD, 72KD, 73KD, 74KD, 75KD, 76KD, or 90KD are pushed the output from amplifier system A–4 causes a suitable corresponding optical density (in the case of an optical track) or magnetic alignment (in the case of a magnetic track) to be recorded on track T6 to reproduce the current output from A–2 required to cause any respective photo-cell 221, 222, 223, 224, 225, 226, 227, 228, 229, 230, 231, 232, or 233 to be actuated as described hereinabove.

After the video portion and sound portion of the wide-angle, stereoscopic, stereophonic portrayal of drama, action, scenes, events, and the like in accordance with the present invention, has been recorded on film or tape, an odor expert sits in a representative seat, on a representative level, within a representative auditorium places panel 210 (which is properly wired as described hereinabove) on his lap, and views properly into KD as a finished production of the video portion and sound portion of the portrayal is being reproduced.

When he believes the portrayal requires sunshine simulation corresponding to photo-cell 233, he pushes 90KD to connect said thirteenth potential across amplifier A–4. When he believes the portrayal requires the odor corresponding to photo-cell 226 (as shown in FIG. 6), he pushes 57K to connect said sixth potential across amplifier A–4. Likewise when he believes the portrayal requires any one of the eleven other substantially different odors corresponding to photo-cells 221, 222, 223, 224, 225, 227, 228, 229, 230, 231, or 232 he pushes the corresponding respective key of 52K, 53K, 54K, 55K, 56K, 71KD, 72KD, 73KD, 74KD, 75KD or 76KD to connect said first, second, third, fourth, fifth, seventh, eighth, ninth, tenth, eleventh, or twelfth respective potential across A–4. The output of terminals 271 and 272 may be applied through a suitable amplifier to moving coil 217 (see FIG. 6) such that he may smell the exact odors he is recording as he views into KD to see and hear the wide-angle, stereoscopic, stereophonic portrayal which is being reproduced before him.

At this point some of the contemplated methods of reproducing and recording wind velocity and direction will be set forth. For the purpose of explanation the processes and apparatus used in reproducing wind direction and velocity will be set forth first.

Figure 10:
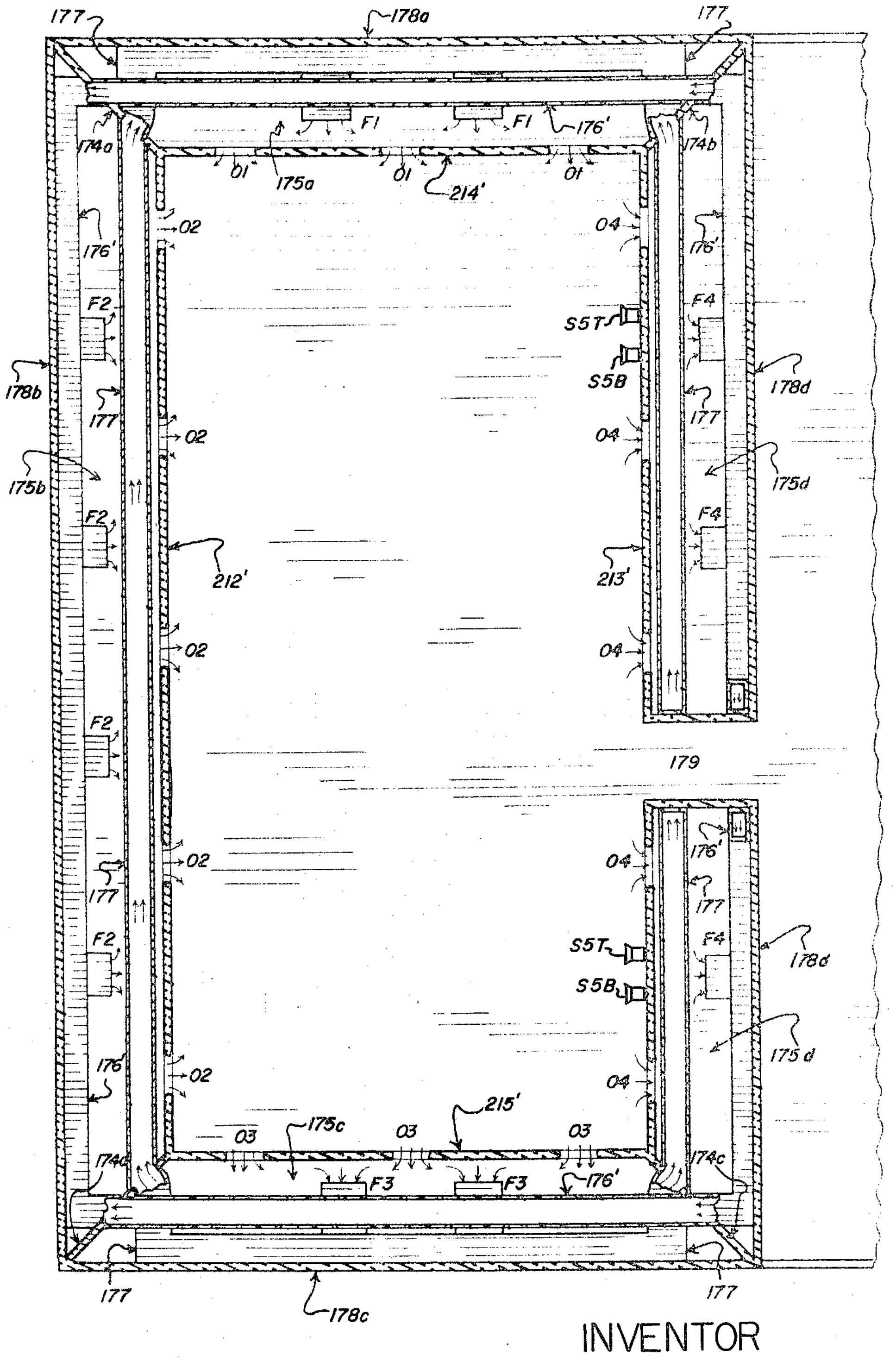
FIG. 10 is a sectional view of a contemplated representative level of the auditorium of the invention.
Figure 11:
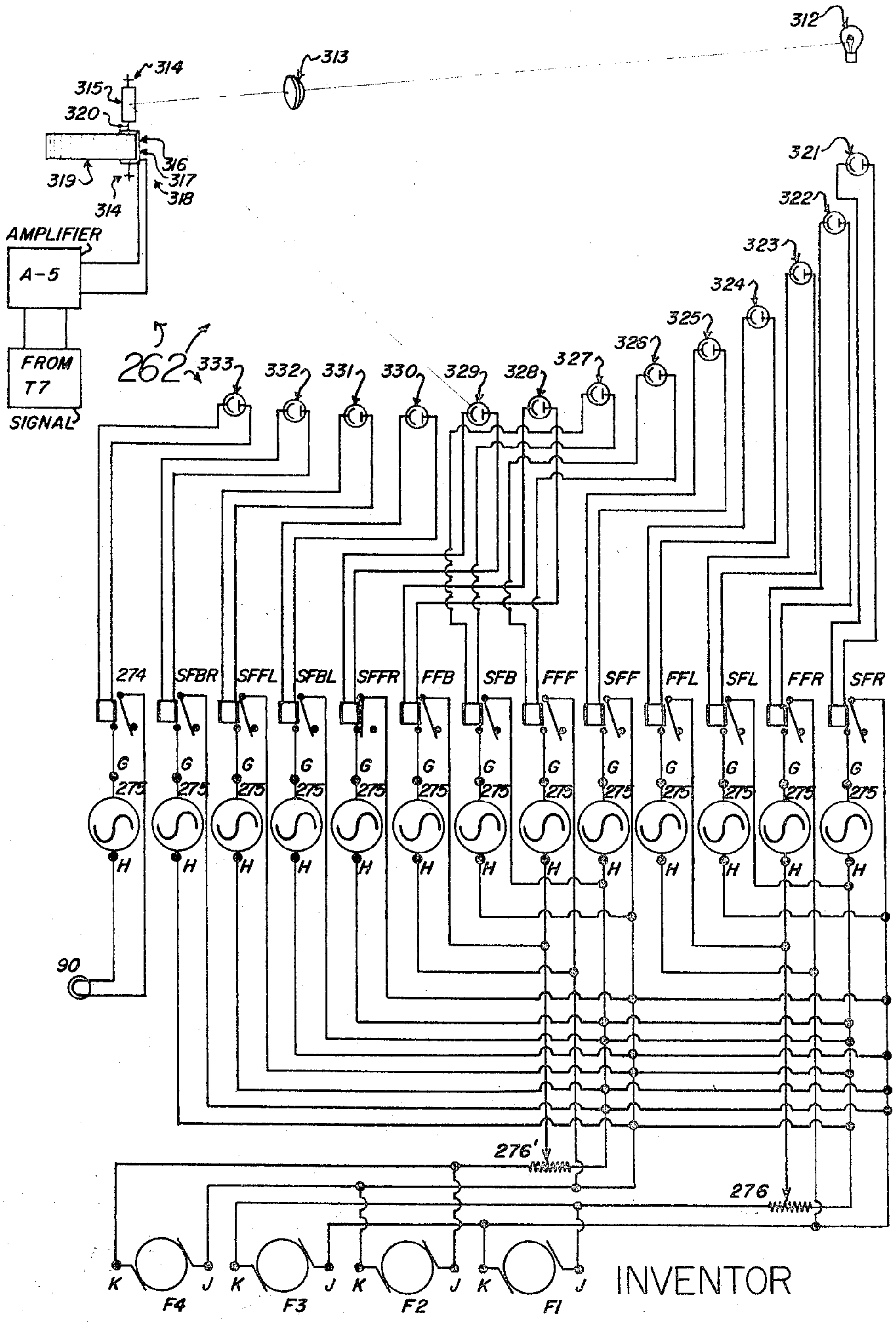
FIG. 11 is designed to illustrate the contemplated switch which electronically controls the wind velocity simulation of the present invention.

Reference is made to FIGS. 10 and 11. Fan system F1, fan system F2, fan system F3, and fan system F4 con-consist (in the contemplated form of the invention) of centrifugal fans (as defined by Modern Air Conditioning Heating and Ventilating written by Carrier, Cherne, Grant, and Roberts, third edition, published by Pitman Publishing Corporation, New York, Toronto, London—Copyright 1940), and have universal single-phase series motors (as described on pages 479–482 of Principles and Practice of Electrical Engineering written by Gray and Wallace, seventh edition, published by McGraw-Hill—New York, Toronto, London) which are preferably designed to run from A.C. current. However, any other well known means to accomplish the following described results may be used without departing from the scope of this invention. In the contemplated form of the invention each level of the auditorium is capable of reproducing twelve wind conditions from track T7 of film F of FIG. 13. Switch 262 of FIG. 11 works as switch 260 of FIG. 6 described hereinabove in that 312, 313, 314, 315, 316, 317, 318, 319, 320, 321, 322, 323, 324, 325, 326, 327, 328, 329, 330, 331, 332, and 333 of FIG. 11 function as 212, 213, 214, 215, 216, 217, 218, 219, 220, 221, 222, 223, 224, 225, 226 227, 228, 229, 230, 231, 232, and 233, respectively, of FIG. 6 described hereinabove. When the signal from T7 is such that the output from amplifier A–5 causes photo-cell 321 to be energized, relays SFR is thrown (this connects the G terminal of A.C. power source 275 to the K terminals of the motors of the F1 fan system and to the J terminals of the motors of the F3 fan systems. This also connects the H terminal of A.C. power source 275 through power loss 276 to the J terminals of the motors of the F1 fan system and to K terminals of the motors of the F3 fan system. It is well known that when universal single-phase series motors (described hereinabove) are used a G to J and H to K connection would cause the motors to run a direction opposite that the motors would run with a G to K and H to J connection. The design of the contemplated mode of operation is such that a G to K and H to J connection causes a given fan to force air out while a G to J and H to K connection causes a given fan to pull air within it. It may now be seen that when relay SFR is closed as described hereinabove, fan system F1 (of FIGS. 10 and 11) is forcing air out (in the direction of the arrows of FIG. 10) and fan system F3 is pulling air within (in the direction of the arrows of FIG. 10). The air which is forced out of fan system F1 is forced into muffling chamber 175*a* (which is sealed from muffling chambers 175*b* and 175*d*) where it is silenced. The pressure from F1 forces the air from 175*a*, out of openings O1 (within the right wal 214' of the auditorium) into each level of the auditorium. The path of least resistance for the air forced out of wall 214' is across each level of the auditorium to openings O3 in left wall 215' of the auditorium, into muffling chamber 175*c* (which is also sealed from muffling chambers 175*b* and 175*d*) into fan system F3, through duct system 177 back to fan system F1 (which is the place of beginning to thereby simulate wind slowly blowing from the right. It is here pointed out that duct 177 goes over entrance areas 179 and is thereby not blocked by 179. It is here pointed out that an alternative method is for the F3 system to remain idle while the F1 system forces air out.

When the signal from T7 is such that the output from amplifier A–5 causes photo-cell 322 to be energized, relay FFR is thrown. This causes the same connections as SFR, but causes power loss 176 to be substantially by-passed to thereby cause fan systems F1 and F3 to operate faster to thereby cause faster wind simulation from the right. It is here also pointed out that an alternative method is for the F3 system to remain idle while the F1 system forces air out.

When the signal from T7 is such that the output from amplifier A–5 causes photo-cell 323 to be energized, relay SFL is thrown. This connects the G terminal of power source 275 through power loss 276 to the J terminals of the F1 system and the K terminals of the F3 system. This also connects the H terminal of power source 275 to the K terminals of the F1 system and the J terminals of F3 system. As described hereinabove these connections cause the F3 fans to force air out (in a direction opposite the arrows of FIG. 10) and the F1 fans to pull air within (in a direction opposite the arrows of FIG. 10). Therefore the F3 fan system (of FIGS. 10 and 11) is forcing air out into muffling chamber 175*c* where it is silenced. The pressure from F3 forces the air from 175*c*, out of openings O3 (within left wall 215' of the auditorium) into each level of the auditorium. The path of least resistance for the air forced out of wall 215' is across each level of the auditorium to openings O1 in right wall 214' of the auditorium, into muffling chamber 175*a* into fan system F1, through duct system 177 back to fan system F3 (which is the place of beginning), to thereby simulate wind slowly blowing from the left. It is here also pointed out that an alterative method is for the F1 fan system to remain idle while the F3 fan system forces air out.

When the signal from T7 is such that the output from amplifier A–5 causes photo-cell 324 to be energized, relay FFL is thrown. This causes the same connections as SFL but causes power loss 276 to be substantially by-passed to thereby cause fan systems F3 and F1 to operate faster to thereby cause faster wind simulation from the left. It is here also pointed out that an alternative method is for the F1 fan system to remain idle while the F3 fan system forces air out.

When the signal from T7 is such that the output from amplifier A–5 causes photo-cell 325 to be energized, relay SFF is thrown. This connects the G terminal of power source 275 to the K terminals of the F2 fan system and to the J terminals of the F4 fan system. This also connects the H terminal of power source 275 through power loss 276' to the J terminals of the F2 fan system and the K terminals of the F4 fan system. As described hereinabove these connections cause the F2 fans to force air out (in the direction of the arrows of FIG. 10) and the F4 fans to pull air within (in the direction of the arrows of FIG. 10). Therefore the F2 fan system (of FIGS. 10 and 11) is forcing air out into muffling chamber 175*b* (which is sealed from muffling chambers 175*a* and 175*c*) where it is silenced. The pressure from the F3 system forces the air from 175*b*, out of openings O2 (within front wall 212' of the auditorium) into each level of the auditorium. The path of least resistance for the air forced out of wall 212' is across each level of the auditorium to openings O4 in rear wall 213' of the auditorium, into muffling chamber 175*d* into fan system F4, through duct system 176' back to fan system F2 (which is the place of beginning), to thereby simulate wind slowly blowing from the front. It is here also pointed out that an alternative method is for the F4 fan system to remain idle while the F2 fan system forces air out.

When the signal from T7 is such that the output from amplifier A–5 causes photo-cell 326 to be energized, relay FFF is thrown. This causes the same connections as SFF but causes power loss 276' to be substantially by-passed to thereby cause fan systems F2 and F4 to operate faster to thereby cause faster wind simulation from the front. It is here also pointed out that an alternative method is for the F4 fan system to remain idle while the F2 fan system forces air out.

When the signal from T7 is such that the output from amplifier A–5 causes photo-cell 327 to be energized, relay SFB is thrown. This connects the G terminal of power source 275 through power loss 276′ to the J terminals of the F2 fan system, and to the K terminals of the F4 fan system. This also connects the H terminal of power source 275 to the K terminals of the F2 fan system and the J terminals of the F4 fan system. As described hereinabove these connections cause the F2 fans to pull air within (in a direction opposite the arrows of FIG. 10) and the F4 fans to force air out (in a direction opposite the arrows of FIG. 10). Therefore the F4 fan system (of FIGS. 10 and 11) is forcing air out into muffling chamber **175*d* where it is silenced. The pressure from the F4 system forces the air from 175*d* out of openings O4 (within rear wall 213′ of the auditorium) into each level of the auditorium. The path of least resistance for the air forced out of wall 213′ is across each level of the auditorium to openings O2 in front wall 212′ of the auditorium, into muffling chamber 175*b* into fan system F2, through duct system 176′** back to fan system F4 (which is the place of beginning), to thereby simulate wind slowly blowing from the rear. It is here pointed out that other alternative include the F2 fan system remaining idle while the F4 fan system forces air out.

When the signal from T7 is such that the output from amplifier A–5 causes photo-cell 328 to be energized, relay FFB is thrown. This causes the same connections as SFB but causes power loss 276′ to be substantially by-passed to thereby cause fan systems F4 and F2 to operate faster to thereby cause faster wind simulation from the rear.

When the signal from T7 is such that the output from amplifier A–5 causes photo-cell 329 to be energized as shown in FIG. 11, relay SFFR is thrown as shown in FIG. 11. This connects the G terminal of power source 275 to the J terminals of the F3 and F4 fan systems and to the K terminals of the F1 and F2 fan systems. This also connects the H terminal of power source 275 through power losses 276 and 276′ to the K terminals of the F3 and F4 fan systems and the J terminals of the F1 and F2 fan systems. As described hereinabove these connections cause the F1 and F2 fans to force air out (in the direction of the arrows of FIG. 10) and the F3 and F4 fans to pull air within (in the direction of the arrows of FIG. 10). Therefore, the F1 and F2 fan systems are forcing air out (as shown in FIG. 10) into muffling chambers **175*a* and 175*b* respectively where it is silenced. The pressure from the F1 and F2 systems forces the air from 175*a* and 175*b* out of openings O1 and O2 respectively within walls 214′ and 212′ respectively) into each level of the auditorium. The path of least resistance for the air forced out of walls 214′ and 212′ is diagonally across each level of the auditorium to openings O3 and O4 in left and rear walls 215′ and 213′ respectively, into muffling chambers 175*c* and 175*d* respectively, into fan systems F3 and F4 respectively, through duct systems 177 and 176′** respectively, and back to fan systems F1 and F2 respectively (which is the place of beginning), to thereby simulate wind blowing from the proximity of the forward right hand corner.

When the signal from T7 is such that the output from amplifier A–5 causes photo-cell 330 to be energized, relay SFBL is thrown. This connects the G terminal of power source 275 through power losses 276 and 276′, to the J terminals of the F1 and F2 fan systems and to the K terminals of the F3 and F4 fan systems. This also connects the H terminal of power source 275 to the K terminals of the F1 and F2 fan systems and the J terminals of the F3 and F4 fan systems. As described hereinabove these connections cause the F3 and F4 fans to force air out (in a direction opposite the arrows of FIG. 10) and the F1 and F2 fans to pull air within (in a direction opposite the arrows of FIG. 10). Therefore, the F3 and F4 fan systems are forcing air out into muffling chambers **175*c* and 175*d* respectively where it is silenced. The pressure from the F3 and F4 fan systems forces the air from 175*c* and 175*d* out of openings O3 and O4 respectively (within walls 215′ and 213′ respectively) into each level of the auditorium. The path of least resistance for the air forced out of walls 215′ and 213′ is diagonally across each level of the auditorium to openings O1 and O2 in the right and front walls 214′ and 212′ respectively, into muffling chambers 175*a* and 175*b* respectively, into fan system F1 and F2 respectively, through duct systems 177 and 176′** respectively, and back to fan systems F3 and F4 respectively (which is the place of beginning), to thereby simulate wind blowing from the proximity of the rear left hand corner.

When the signal from T7 is such that the output from amplifier A–5 causes photo-cell 331 to be energized, relay SFFL is thrown. This connects the G terminal of power source 275 to the J terminals of the F4 fan system and the K terminals of the F2 system, and connects the G terminal through power loss 276, to the K terminals of the F3 system and the J terminals of the F1 system. This also connects the H terminal of power source 275 through power loss 276′ to the K terminals of fan system F4 and the J terminals of fan system F2, and connects the H terminal to the J terminals of fan system F3 and the K terminals of fan system F1. As described hereinabove, these connections cause the F2 and F3 fans to force air out and the F1 and F4 fans to pull air within. Therefore, the F2 and F3 fan systems are forcing air out into muffling chambers **175*b* and 175*c* respectively where it is silenced. The pressure from the F2 and F3 fan systems forces the air from 175*b* and 175*c* out of openings O2 and O3 respectively (within walls 212′ and 215′ respectively) into each level of the auditorium. The path of least resistance for the air forced out of walls 212′ and 215′ is diagonally across each level of the auditorium to openings O1 and O4 in right and rear walls 214′ and 213′ respectively, into muffling chambers 175*a* and 175*d* respectively, into fan systems F1 and F4 respectively, through duct systems 177 and 176′** respectively, and back to fan systems F3 and F2 respectively (which is the place of beginning), to thereby simulate wind blowing from the proximity of the front left hand corner.

When the signal from T7 is such that the output from amplifier A–5 causes photo-cell 332 to be energized, relay SFBR is thrown. This connects the G terminal of power source 275 through power loss 276′ to the J terminals of the F2 fan system and the K terminals of the F4 fan system, and connects the G terminal to the J terminals of the F3 fan system, and the K terminals of the F1 fan system. This also connects the H terminal of power source 275 to the K terminals of the F2 fan system and the J terminals of the F4 fan system, and connects the H terminal through power loss 276 to the J terminals of the F1 fan system, and the K terminals of the F3 fan system. As described hereinabove, these connections cause the F1 and F4 fans to force air out and the F2 and F3 fans to pull air within. Therefore, the F1 and F4 fan systems are forcing air out into muffling chambers **175*a* and 175*d* respectively where it is silenced. The pressure from the F1 and F4 fan systems forces the air from 175*a* and 175*d* out of openings O1 and O4 respectively (within walls 214′ and 213′ respectively) into each level of the auditorium. The path of least resistance for the air forced out of walls 214′ and 213′ is diagonally across each level of the auditorium to openings O2 and O3 in front and left walls 212′ and 215′ respectively, into muffling chambers 175*b* and 175*c* respectively, into fan systems F2 and F3 respectively, through duct systems 176′ and 177** respectively, and back to fan systems F4 and F1 respectively (which is the place of beginning), to thereby simulate wind blowing from the proximity of the rear right hand corner.

When the signal from T7 is such that the output from amplifier system A–5 causes photo-cell 333 to be energized, relay 274 is thrown. This also turns on sunshine simulating lamps 90 (which are each behind each kinescopic optical viewing device KD).

It may now be seen that it is possible to place a signal on any one of tracks T5, T6, or T7 which will cause sunshine simulating lamps 90 to turn on.

Figure 12:
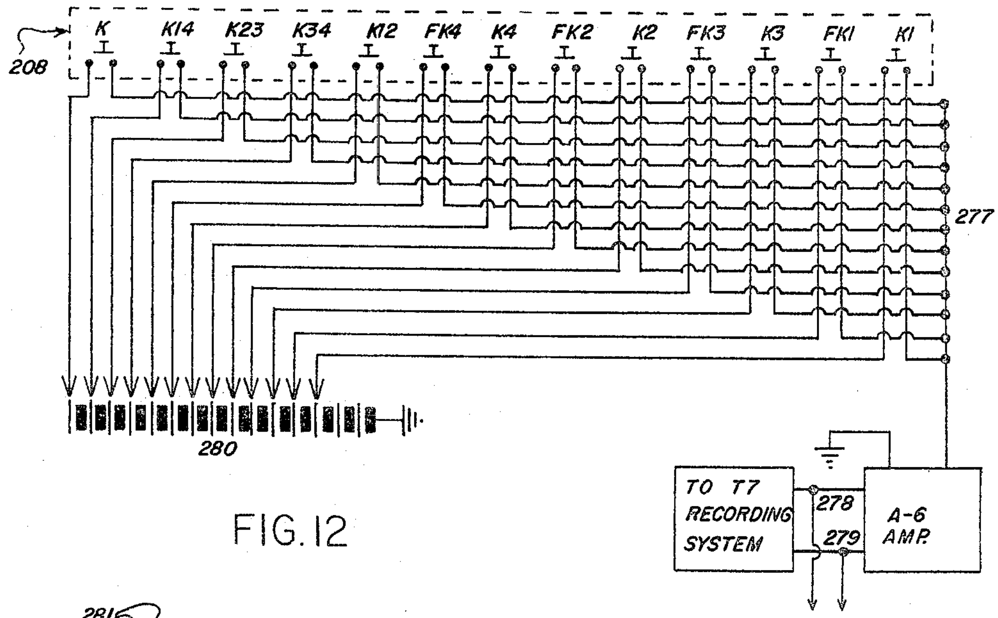
FIG. 12 is a schematic diagram designed to illustrate the contemplated manner of recording the proper wind velocity (direction and speed) simulation and some other sunshine simulating signals of the invention.

Reference is now made to FIG. 12. Push button switches or keys K1, FK1, K3, FK3, K2, FK2, K4, FK4, K12, K34, K23, K14, and K are all placed on a single panel (or switch board 208, which is made small enough in a well known manner to be placed in the lap of a single person. Switch K1 is connected across a first voltage which is the least potential output of D.C. power source 280. Switch FK1 is connected across a second slightly higher potential output of D.C. power source 280 than is K1. Switch K3 is connected across a third slightly higher potential output of D.C. power source 280 than is FK1. Switch FK3 is connected across a fourth slightly higher potential output of D.C. power source 280 than is K3. Switch K2 is connected across a fifth slightly higher potential output of D.C. power source 280 than is FK3. Switch FK2 is connected across a sixth slightly higher potential output of D.C. power source 280 than is K2. Switch K4 is connected across a seventh slightly high potential output of D.C. power source 280 than is FK2. Switch FK4 is connected across an eighth slightly higher potential output of D.C. power source 280 than is K4. Switch K12 is connected across a ninth slightly higher potential output of D.C. power source 280 than is FK4. Switch K34 is connected across a tenth slightly higher potential output of D.C. power source 280 than is K12. Switch K23 is connected across an eleventh slightly higher potential output of D.C. power source 280 than is K34. Switch K14 is connected across a twelfth slightly higher potential output of D.C. power source 280 than is K23. And switch K is connected across a thirteenth slightly higher potential output of D.C. power source 280 than is K14.

In a manner similar to that described for FIGS. 8 and 9 of the present invention when any one of keys K1, FK1, K3, FK3, K2, FK2, K4, FK4, K12, K34, K23, K14, or K are pushed the output from amplifier system A–6 causes a suitable corresponding optical density (in the case of an optical track) or magnetic alignment (in the case of a magnetic track) to be recorded on track T7 such as to reproduce the current output from A–5 required to cause any respective photo-cell 321, 322, 323, 324, 325, 326, 327, 328, 329, 330, 331, 332, or 333 to be actuated (or energized).

After the video portion, sound portion, odor portion, temperature portion, and their associated sunshine portion of the wide-angle-stereoscopic, stereophonic, odor reproducing, temperature simulating and sunshine simulating (heat radiation reproduction) portrayal of drama, action, scenes, events, and the like has been recorded on a single film or tape as hereinabove described, a wind direction and velocity expert sits in a representative seat, on a representative level, within a representative auditorium, places panel 208 (which is properly wired as described hereinabove) on his lap, and views properly into KD as a finished production of the video portion, sound portion, odor portion, temperature portion of the portrayal is being reproduced. Of course his recorded signals are monitored by the fan systems of the representative auditorium in which he sits.

When he believes the portrayal requires any of the hereinabove described wind directions he pushes the corresponding hereinabove described key. Also when he believes the portrayal requires sunshine simulation which has not as yet been recorded, he pushes key K. In this manner he records the proper signals on track T7 to reproduce wind direction and velocity simulation in accordance with his talent or skill.

Figure 13:
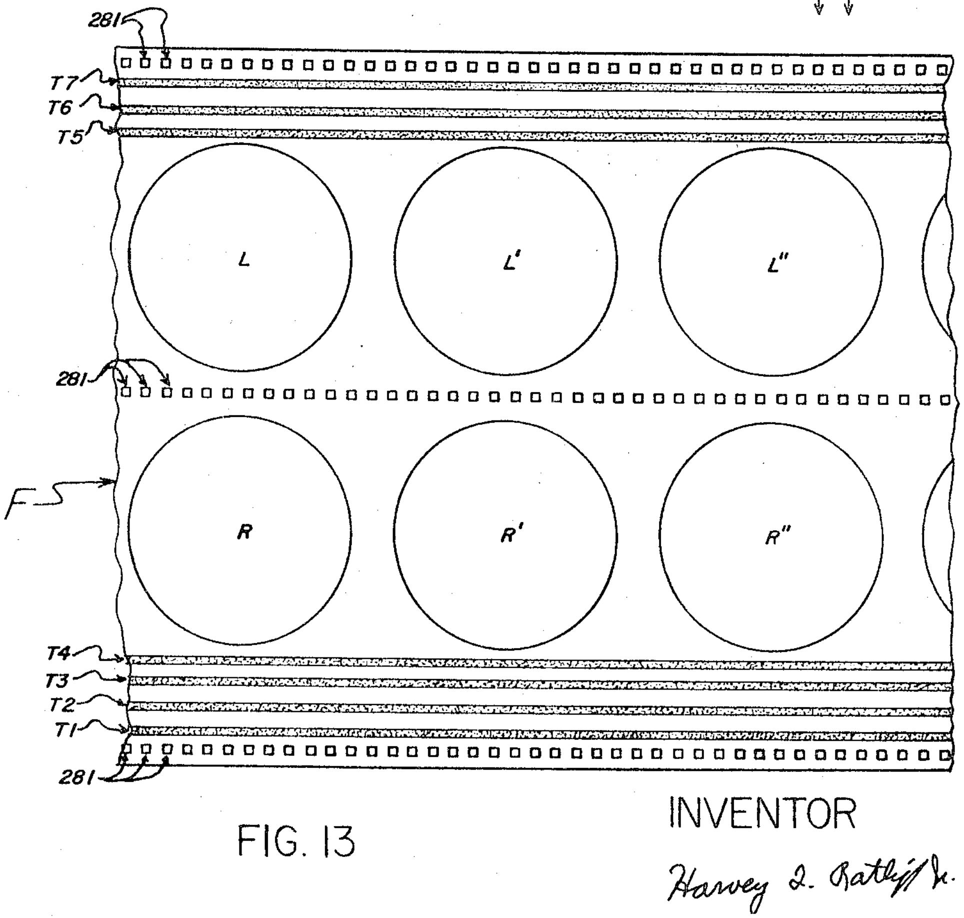
FIG. 13 is designed to illustrate the appearance of one contemplated recording media after it has had the complete portrayal of the invention recorded thereon.

It may now be seen that on a single film (such as F having left eye view frames L, L′, and L″ and right eye view frames R, R′, R″, and perforations 281 of FIG. 13) a wide-angle, stereoscopic, stereophonic, odor simulating, temperating simulating, sunshine simulating, and wind direction and velocity simulating portrayal of drama, action, scenes, events, or the like may be recorded in accordance with the herein described invention.

It is here pointed out that a single expert having a single panel which has upon it the thirteen keys of FIG. 8 plus the thirteen keys of FIG. 9 plus the thirteen keys of FIG. 12 could record the odor signals, the temperature signals, the sunshine signals, and the wind signals and monitor what he records from terminals 267, 268, 271, 272, 278, and 279.

It is also pointed out that the stereophonic sound is recorded on track T1, T2, T3, and T4 in accordance with my above cited co-pending application 287,338. Also tape similar to that shown in FIG. 8 or film similar to that of FIG. 7 of 287,338, each having seven magnetic (as shown in FIG. 13 of the present invention) or seven optical (as shown in FIGS. 6, 7, and 8 of 287,338) tracks including the four stereophonic sound tracks in accordance with 287,338 and the three tracks in accordance with the present invention.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

What I claims is:

1. A process for a portrayal of drama, action, scenes, events, and the like comprising the steps of: first recording wide-angle stereoscopic motion pictures of said portrayal upon a media, second recording substantially every directional component of sound of said portrayal upon said media, third recording the temperature conditions of said portrayal upon said media, fourth recording the odor conditions of said portrayal upon said media, fifth recording the wind speed and directional conditions of said portrayal upon said media, sixth recording the heat radiation conditions of said portrayal upon said media, seventh reproducing said wide-angle stereoscopic motion picture, said substantially every directional component of sound, said temperature condition, said odor conditions, said wind speed and directional conditions, and said heat radiation conditions of said portrayal from said media simultaneously before different viewing observers.

2. A process for a portrayal of drama, action scenes, events, and the like comprising the steps of: first recording wide-angle left eye view motion pictures of said portrayal upon a media and wide-angle right eye view motion pictures of said portrayal upon said media, second recording substantially every directional component of sound of said portrayal upon said media, third recording the odor conditions of said portrayal upon said media, fourth reproducing strips of said wide-angle left eye view in overlapping alternate conjugate relation to strips of said wide-angle right eye view at distances less than 12 inches from at least 100 different contiguous viewing observers at a specific instant of time to thereby reproduce a wide-angle stereoscopic portrayal for each of said viewing observers at said instant, fifth reproducing said substantially every directional component of sound of said portrayal before each of said viewing observers at said instant, and sixth reproducing said odor conditions of said portrayal at distances less than 12 inches from each of said viewing observers at said instant.

3. A process for a portrayal of drama, action, scenes, events, and the like comprising the steps of: first recording wide-angle left eye view motion pictures of said portrayal upon a media, second recording wide-angle right eye view motion pictures of said portrayal upon said media, third recording substantially every forward directional component of sound of said portrayal upon said media, fourth recording substantially every right directional component of sound of said portrayal upon said media, fifth recording substantially every left directional component of sound of said portrayal upon said media, sixth recording substantially every upward directional component of sound of said portrayal upon said media, seventh recording substantially every downward directional component of sound of said portrayal upon said media, eighth recording substantially every rearward directional component of sound of said portrayal upon said media, ninth recording any one of twelve different odor conditions of said portrayal upon said media, tenth reproducing strips of said wide-angle left eye view of said portrayal in overlapping alternate conjugate relation to strips of said wide-angle right eye view of said portrayal immediately in front of the eyes of at least 100 different contiguous viewing observers at the same instant of time, eleventh reproducing said substantially every forward directional components of sound of said portrayal immediately in front of the most forward portion of the head of each of said viewing observers at said instant, twelfth reproducing said substantially every right directional component of sound of said portrayal immediately adjacent the right ear of each of said viewing observers at said instant, thirteenth reproducing said substantially every left directional component of sound of said portrayal immediately adjacent the left ear of each of said viewing observers at said instant, fourteenth reproducing said substantially every upward directional component of sound above the ears and immediately adjacent each of said viewing observers at said instant, fifteenth reproducing said substantially every downward directional component of sound below the ears and immediately adjacent each of said viewing observers at said instant, sixteenth reproducing said substantially every rearward directional component of sound behind everyone of said viewing observers observing said portrayal at said instant, and seventeenth reproducing said any one of said twelve different odor conditions of said portrayal immediately adjacent the nose of each of said viewing observers at said instant.

4. Apparatus for a portrayal of drama, action, scenes, events, and the like comprising: an auditorium with at least one level and a multiplicity of seats therein; a cooling system within said auditorium; a heating system within said auditorium; a thermostat which controls said cooling system and said heating system; a first electronic system which controls the temperature said thermostat causes said cooling system and said heating system to make exist within said auditorium, said first electronic system being controlled by electronic signals recorded on a first track upon a media; a first duct system within said auditorium; odor emitting vessels immediately adjacent each seat of said auditorium; said first duct system passing the air—which passes through said cooling system—and the air—which passes through said heating system—over each of said odor emitting vessels by a seat of said auditorium; a second electronic system which controls which vessel will emit its corresponding odor, said second electronic system being controlled by electronic signals recorded on a second track upon said media; a first fan system behind the right wall of said auditorium; a second fan system behind the front wall of said auditorium; a third fan system behind the left wall of said auditorium; a fourth fan system behind the rear wall of said auditorium; a third electronic system which can cause said first and third fan systems to produce wind simulation from the right, said first and third fan systems to produce wind simulation from the left, said second and fourth fan systems to produce wind simulation from the front, said second and fourth fan system to produce wind simulation from the rear, and said first, second, third and fourth fan systems to produce wind simulation from the front right, front left, rear left, and rear right, said third electronic system being controlled by electronic signals from a third track upon said media; sunshine simulating lamps which are each over each said seat within said auditorium; a fourth electronic system which controls the operation of said sunshine simulating lamps, said fourth electronic system being controlled by electronic signals from said first, second, and third tracks upon said media; a first speaker system within said auditorium wide-angle, stereoscopic kinescopic optical viewing devices which are each over said seat within said auditorium, each of said kinescopic optical viewing devices causing images of said portrayal to enter the eyes of an observer viewing thereinto at wide-angles, each of said kinescopic optical viewing devices supporting odor openings immediately adjacent the nose of any viewing observer viewing into a kinescopic optical viewing device, each of said kinescopic optical viewing device supporting said first speaker system such that each speaker of said first speaker system is immediately adjacent the head of each viewing observer viewing properly into a kinescopic optical viewing device within said auditorium, each of said kinescopic optical viewing devices being secured to bases which are each immediately adjacent each seat within said auditorium by several elements such that each said kinescopic optical viewing device may be rotated relative to any vertical plane, relative to a horizontal plane, may be moved forward, backward, to the right, to the left, upward, and downward; a second speaker system which is supported by the rear wall of said auditorium; the relative sound intensity from the speakers within said first speaker systems and said second speaker system being controlled by a fifth electronic system, said fifth electronic system being controlled by electronic signals derived from fourth, fifth, sixth, and seventh tracks upon said media; said first speaker systems and said second speaker system co-operating together to reproduce a resultant directional component of sound which is in accordance with the signals recorded upon said fourth, fifth, sixth, and seventh tracks upon said media, said resultant directional component of sound may make sound appear in front of each viewing observer, to the right of each viewing observer, to the left of each viewing observer, above each viewing observer, below each viewing observer, to the rear of each viewing observer depending upon the signals recorded upon said fourth, fifth, sixth, and seventh tracks upon said media to portray said portrayal, a sixth electronic system which reproduces images of wide-angle stereoscopic views of said portrayal; means coacting with said cooling, heating, and duct system to pass said air from said odor emitting vessels out said odor openings; within each said kinescopic optical viewing device before the eyes of each viewing observer, said sixth electronic system being controlled by signals recorded upon said media, optical means within each of said stereoscopic kinescopic optical viewing devices which works in conjunction with said images to create the sensaton of wide-angle stereo-peripheral vision whereby the temperature conditions are re-created for every viewing observer within said auditorium, odor conditions are re-created immediately adjacent the nose of each viewing observer at a seat within said auditorium, wind speed and directional conditions are re-created for every observer within said auditorium, sunshine conditions are re-created adjacent each observer at a seat within said auditorium, wide-angle stereoscopic visual conditions are re-created immediately in front of the eyes of each viewer at a seat within said auditorium viewing into a kinescopic optical viewing device, and directional components of sound are reproduced behind all and immediately adjacent the face of each to produce said resultant directional component of sound for every viewing observer setting at a seat and viewing into a said device within said auditorium of a portrayal; and each viewing observer is free to move from one comfortable setting and observing position to another within the respective seat while viewing into the respective said device and otherwise sensing said portrayal.

5. The apparatus of claim 4 in which each said wide-angle stereoscopic kinescopic optical viewing device comprises: an enclosed, hollow casing, one portion of said casing being concave to fit about the face of a viewing observer, said one portion having two eye openings, a means to support said eye openings in position to be looked through by said viewing observer, two television units mounted within said casing so that one television unit is visible through each of said eye openings, and an optical unit mounted in each of said eye openings whereby peripheral light from said television units enters the eyes of said viewing observer to create a sensation of peripheral vision of at least 120°.

6. The apparatus of claim 4 in which each said wide-angle, stereoscopic, kinescopic optical viewing device comprises: an enclosed, hollow casing, one portion of said casing being concave to fit about the face of said viewing observer, said one portion having two eye openings, a means to support said eye openings in position to be looked through by a viewing observer, one television unit having a single screen mounted within said casing, a left eye view image being reproduced on said screen so that it is visible to only the left eye of a viewing observer, a right eye view image being reproduced on said screen in overlapped relation with said left eye view image so that it is visible to only the right eye of a viewing observer, an optical element mounted in each of said openings co-operating with said images reproduced on said screen such that peripheral light from said screen enters the eyes of said viewing observer to creat a sensation of peripheral vision of at least 120°.

7. Apparatus for a portrayal of drama, action, scenes, events, and the like comprising: an auditorium with at least one level and a multiplicity of seats therein; an air-conditioning system within said auditorium; a duct system within said auditorium; odor emitting vessels immedately adjacent each seat of said auditorium; said air-conditioning system and said duct system co-operating together to pass the air-conditioned air over each of said odor emitting vessels within said auditorium; a first electronic system which controls which vessel will emit its corresponding odor, said first electronic system being controlled by electronic signals recorded on a first track upon a media; a first speaker system within said auditorium; wide-angle stereoscopic kinescopic optical viewing devices which are each over each seat within said auditorium, each of said kinescopic optical viewing devices causing images of said portrayal to enter the eyes of an observer viewing thereinto at wide-angles, each of said kinescopic optical viewing devices supporting each said odor openings immediately adjacent the nose of any viewing observer viewing into a kinescopic optical viewing device, each of said kinescopic optical viewing devices supporting said first speaker system such that each speaker of said first speaker system is immediately adjacent the head of each viewing observer viewing properly into a kinescopic optical viewing device within said auditorium, each of said kinescopic optical viewing devices beng secured to bases which are immediately adjacent each seat within said auditorium by several elements such that each said kinescopic optical viewing device may be rotated relative to any vertical plane, relative to a horizontal plane, may be moved forward, backward, to the right, to the left, upward, and downward; a second speaker system which is supported by the rear wall of said auditorium; the relative sound intensity from the speakers within said first speaker systems and said second speaker system being controlled by a second electronic system, said second electronic system being controlled by electronic signals derived from second, third, fourth, and fifth tracks upon said media; said first speaker systems and said second speaker system co-operating together to reproduce a resultant directional component of sound which is in accordance with the signals recorded upon said second, third, fourth, and fifth tracks upon said media, said resultant directional component of sound may make sound appear in front of each viewing observer, to the right of each viewing observer, to the left of each viewing observer, above each viewing observer, below each viewing observer and to the rear of each viewing observer depending upon the signals recorded upon said second, third, fourth, and fifth tracks upon said media to portray said portrayal; means coacting with said air-conditioning and duct system to pass said air from said odor emitting vessels out said odor openings; a third electronic system which reproduces said images of wide-angle stereoscopic views of said portrayal within each said kinescopic optical viewing device before the eyes of each viewing observer, said third electronic system being controlled by signals recorded upon said media, optical means within each of said stereoscopic kinescopic optical viewing devices which works in conjunction with said images to create the sensation of wide-angle stereo-peripheral vision whereby the odor conditions are re-created immediately adjacent the nose of each viewing observer at a seat, wide-angle stereoscopic visual conditions are re-created immediately in front of the eyes of each viewer at a seat, and directional components of sound are reproduced behind all and immediately adjacent the face of each to produce said resultant directional component of sound for every viewing observer sitting at a seat of a portrayal within said auditorium; and each viewing observer sensing said portrayal is free to move from one comfortable sitting and observing position to another within the respective seat.

8. Apparatus for a portrayal of drama, action, scenes, events, and the like comprising: an auditorium with at least one level and a multiplicity of seats therein; a cooling system within said auditorium; a heating system within said auditorium; a thermostat which controls said cooling system and said heating system; a first electronic system which controls the temperature said thermostat causes said cooling system and said heating system to make exist within said auditorium, said first electronic system being controlled by eletronic signals recorded on a first track upon a media; a first duct system within said auditorium; odor emitting vessels immediately adjacent each seat of said auditorium; said first duct system passing the air—which passes through said cooling system—and the air—which passes through said heating system—over each of said odor emitting vessels and out odor openings immediately adjacent the nose of each viewing observer within said auditorium; a second electronic system which controls which vessel will emit its corresponding odor, said second electronic system being controlled by electronic signals recorded on a second track upon said media; a first fan system behind the right wall of said auditorium; a second fan system behind the front wall of said auditorium; a third fan system behind the left wall of said auditorium; a fourth fan system behind the rear wall of said auditorium; a third electronic system which can cause said first and third fan systems to produce wind simulation from the right, said first and third fan systems to produce wind simulation from the left, said second and fourth fan systems to produce wind simulation from the front, said second and fourth fan systems to produce wind simulation from the rear, and said first, second, third and fourth fan systems to produce wind simulation from the front right, front left, rear left, and rear right, said third electronic system being controlled by electronic signals from a third track upon said media; sunshine simulating lamps which are each over each said seat within said auditorium; a fourth electronic system which controls the operation of said sunshine simulating lamps, said fourth electronic system being controlled by electronic signals from said first, second, and third tracks upon said media, stereoscopic kinescopic optical viewing devices usable with each said seat within said auditorium, each of said kinescopic optical viewing devices causing stereoscopic images of said portrayal to enter the eyes of an observer viewing thereinto at wide angles, stereophonic speaker systems usable from each said seat within said auditorium; the directional effect of the sound emitted by said stereophonic speaker systems being controlled by a fifth electronic system being controlled by electronic signals derived from tracks upon said media; a sixth electronic system which reproduces said images of stereoscopic views of said portrayal within each said kinescopic optical viewing device before the eyes of each viewing observer, said sixth electronic system being controlled by electronic signals recorded upon said media, optical means within each of said stereoscopic kinescopic optical viewing devices which works in conjunction with said images to create the sensation of stereo-peripheral vision greater than 120° whereby the temperature conditions, odor conditions, wind speed and directional conditions, sunshine conditions, wide-angle stereoscopic visual conditions, and stereophonic sound conditions of said portrayal are re-created before the senses of each observer setting at each seat within said auditorium.

9. The apparatus of claim 8 in which each of said wide-angle stereoscopic kinescopic optical viewing devices comprises: an enclosed, hollow casing, one portion of said casing being concave to fit about the face of a viewing observer, said one portion having two eye openings, a means to support said eye openings in position to be looked through by said viewing observer, two television units mounted within said casing so that one television unit is visible through each of said eye openings, and an optical unit mounted in each of said eye openings whereby peripheral light from said television units enters the eyes of said viewing observer to create a sensation of peripheral vision of at least 120°.

10. Apparatus for a portrayal of drama, action, scenes, events and the like comprising: an auditorium with at least one level and a multiplicity of seats therein; a cooling system within said auditorium; a heating system within said auditorium; a thermostat which controls said cooling system and said heating system, a first electronic system; which controls the temperature said thermostat causes said cooling system and said heating system to make exist within said auditorium, said first electronic system being controlled by electronic signals recorded on a first track upon a media; a first duct system within said auditorium; odor emitting vessels immediately adjacent each seat of said auditorium; said first duct system passing the air—which passes through said cooling system—and the air—which passes through said heating system—over each of said odor emitting vessels and out odor openings immediately adjacent the nose of each viewing observer within said auditorium; a second electronic system which controls which vessel will emit its corresponding odor, said second electronic system being controlled by electronic signals recorded on a second track upon said media, sunshine simulating lamps which are each over each said seat within said auditorium; a third electronic system which controls the operation of said sunshine simulating lamps, said third electronic system being controlled by electronic signals from said first and second tracks upon said media; stereoscopic kinescopic optical viewing devices usable with each said seat within said auditorium, each of said kinescopic optical viewing devices causing stereoscopic images of said portrayal to enter the eyes of an observer viewing thereinto at wide angles; stereophonic speaker systems usable from each said seat within said auditorium; the directional effect of the sounds emitted by said stereophonic speaker systems being controlled by a fourth electronic system, said fourth electronic system being controlled by electronic signals derived from tracks upon said media; a fifth electronic system which reproduces said images of stereoscopic views of said portrayal within each said kinescopic optical viewing device before the eyes of each viewing observer, said fifth electronic system being controlled by electronic signals recorded upon said media, optical means within each of said stereoscopic kinescopic optical viewing devices which works in conjunction with said images to create the sensation of stereo-peripheral vision greater than 120° whereby the temperature conditions, odor conditions, sunshine conditions, wide-angle stereoscopic visual conditions, and stereophonic sound conditions of said portrayal are re-created before the senses of each observer setting at each seat within said auditorium.

11. The apparatus of claim 10 in which each of said wide-angle stereoscopic kinescopic optical viewing devices comprises: an enclosed, hollow casing, one portion of said casing being concave to fit about the face of a viewing observer, said one portion having two eye openings, a means to support said eye openings in position to be looked through by said viewing observer, two television units mounted within said casing so that one television unit is visible through each of said eye openings, and an optical unit mounted in each of said eye openings whereby peripheral light from said television units enters the eyes of said viewing observer to create the sensation of peripheral vision of at least 120°.

12. The apparatus of claim 10 in which each of said wide-angle stereoscopic kinescopic optical viewing devices comprises: an enclosed, hollow casing, one portion of said casing being concave to fit about the face of said viewing observer, said one portion having two eye openings, a means to support said eye openings in position to be looked through by a viewing observer, one television unit having a single screen mounted within said casing, a left eye view image being reproduced on said screen so that it is visible to only the left eye of a viewing observer, a right eye view image being reproduced on said screen in overlapped relation with said left eye view image so that it is visible to only the right eye of a viewing observer, an optical element mounted in each of said openings co-operating with said images reproduced on said screen such that peripheral light from said screen enters the eyes of said viewing observer to create a sensation of peripheral vision of at least 120°.

References Cited by the Examiner

UNITED STATES PATENTS

| | | | |
|---|---|---|---|
| 1,711,897 | 5/1929 | Madison | 88—28.9 |
| 2,540,144 | 2/1951 | Stern | 352—85 X |
| 2,562,959 | 8/1951 | Stern | 352—85 |
| 2,566,700 | 9/1951 | Goldsmith | 178—6.5 |
| 2,951,736 | 9/1960 | Black | 346—108 X |
| 2,955,156 | 10/1960 | Heilig | 178—6.5 |

References Cited by the Applicant

UNITED STATES PATENTS

| | | |
|---|---|---|
| 2,388,170 | 10/1945 | McCollum. |
| 2,562,960 | 8/1951 | Stern. |
| 2,861,806 | 11/1958 | Disney. |
| 3,050,870 | 8/1962 | Heilig. |

DAVID G. REDINBAUGH, *Primary Examiner*,

R. L. RICHARDSON, *Assistant Examiner*.